Aug. 20, 1940.                A. A. SMITH                2,212,053
                             BASKET CARRIAGE
                          Filed Dec. 19, 1938
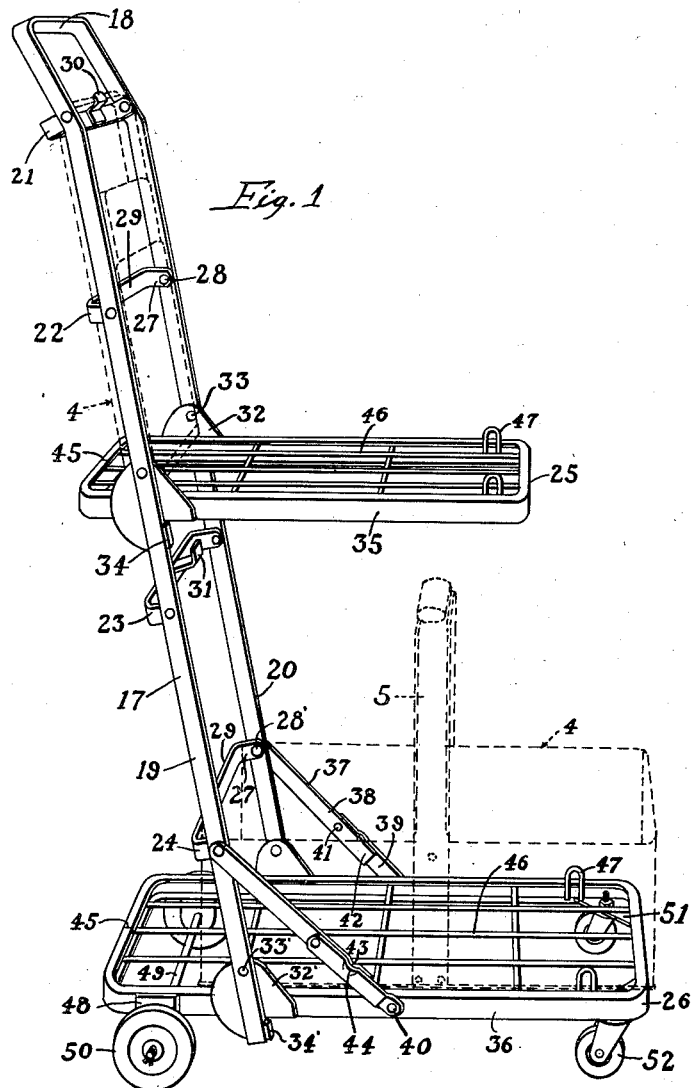
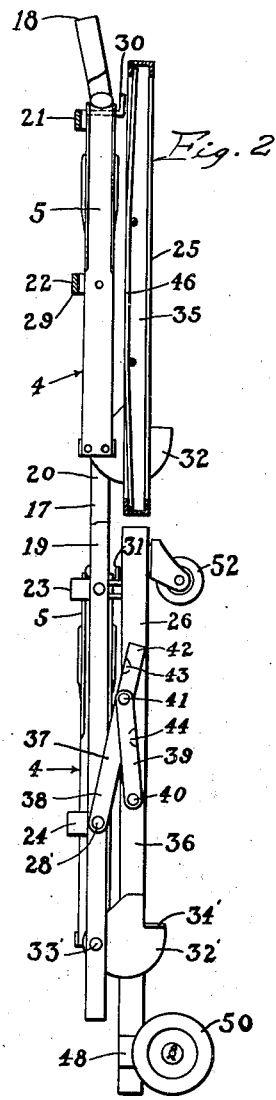
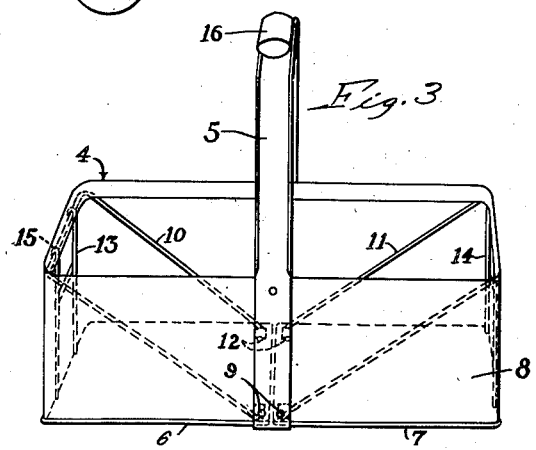
Inventor:
Albert A. Smith
By McCanna, Wintercorn
& Morsbach
Attys.

Patented Aug. 20, 1940

2,212,053

UNITED STATES PATENT OFFICE 2,212,053

BASKET CARRIAGE

Albert A. Smith, Rockford, Ill., assignor, by mesne assignments, to Walter A. Greiner, Madison, Ind.

Application December 19, 1938, Serial No. 246,622

13 Claims. (Cl. 280—36)

This invention relates to a new and improved basket carriage, especially designed and adapted for use in self-service stores as a convenience for shoppers.

One of the principal objects of my invention is to provide a basket carriage having foldable upper and lower basket racks on the upright frame, so designed that a basket on the lower rack can be filled conveniently while the upper rack is folded and out of the way, the two racks when folded toward the frame when the carriage is stacked at the store's entrance with other carriages being so compact that a large number of spare carriages can be kept on hand in a small space, available for instant use by shoppers. The compactness of the folded unit is also of advantage in permitting shipment in smaller, less expensive cartons.

Another important object of the invention is to provide a foldable basket carriage so designed that foldable baskets can be kept in folded condition in the folded carriages behind the folded racks thereof so as to be instantly accessible for the shopper when the racks are unfolded. This also obviates the necessity for providing separate racks or holders for the folded baskets, the baskets used with the carriages being kept therewith as assembled units for the greater convenience of the shoppers. This feature is also of advantage in shipping because the two baskets used with each carriage can be shipped with it in the same carton, with a resulting saving in expense.

The invention is illustrated in the accompanying drawing, in which—

Fig. 1 is a perspective view of a basket carriage made in accordance with my invention, indicating in dotted lines an unfolded basket on the lower rack and a folded basket adjacent the upper rack ready to be removed and unfolded for use on the upper rack or to permit folding of the upper rack toward it;

Fig. 2 is a view partly in side elevation and partly in vertical section of the folded carriage, showing the two folded baskets stored therein, and Fig. 3 is a perspective view of one of the foldable baskets shown unfolded ready for use.

The same reference numerals are applied to corresponding parts throughout the views.

The basket carriage of my invention was especially designed for use with foldable baskets like that illustrated in Fig. 3 and designated by the reference numeral 4, but it will soon appear that the carriage could be used also with ordinary non-folding baskets, wire trays, or wooden or paper boxes, or any other suitable containers. The basket 4 is made up of a frame structure with a fabric covering, and the parts of the frame structure permit convenient folding of the basket into the plane of its sheet metal handle 5, as well as ready extension from the handle to the form shown in Fig. 3. The basket forms the subject matter of Ahlmark and Young Patent 2,042,977, issued June 2, 1936, and, briefly stated, has the sheet metal bottom panels 6 and 7 joined to the fabric side walls 8 and hinged, as at 9, to the lower ends of the handle to fold into the plane of the handle. The wire bails 10 and 11 are hinged at the free ends of the arms thereof, as at 12, to the bottom panels 6 and 7 and their cross-portions give shape to the ends of the basket across the top of the fabric side material 8, the latter being folded over the cross-portions of the bails and sewed, to retain the bails in place. The wire reenforcing frames 13 and 14 are provided for the ends of the basket suitably pivoted, as at 15, on the cross-portions of the bails 10 and 11 and serve to space the cross-portions of the bails from the bottom of the basket and give shape to the ends of the basket when unfolded. When the basket is folded, the bails 10 and 11 fold into the plane of the handle 5 along with the bottom panels 6 and 7 and frames 13 and 14. A wooden hand grip 16 is also preferably provided in the channel-shaped cross-portion of the handle 5.

The basket carriage comprises an inverted U-shaped upright frame 17, the cross-portion 18 of which serves as a handle to be grasped by the shopper in pushing the carriage along the aisle in the store. The two legs 19 and 20 of the frame are held rigidly in parallel relation by U-shaped crosspieces 21—24 disposed horizontally in vertically spaced relation, the crosspieces 21 and 22 being above the upper rack 25 and the crosspieces 23 and 24 being above the lower rack 26. Each of the U-shaped crosspieces 21—24 has its arms 27 extending forwardly for connection with the legs 19 and 20 of the frame 17, the arms being suitably riveted to said legs, as indicated at 28. In that way, the cross-portions 29 of the crosspieces are in rearwardly spaced relation to the frame 17 sufficiently to provide a space for the storage of a folded basket, one supported by its handle 5 on a hook 30 on the crosspiece 21 and resting in abutment with the crosspiece 22, and another suspended by its handle on a hook 31 on the crosspiece 23 and having abutment with the crosspiece 24. The rack 25 extends between the legs 19 and 20 and has segmental plates 32 welded or otherwise suitably secured to the sides thereof and projecting upwardly therefrom alongside the legs 19 and 20 and pivoted to the latter on studs 33. Lugs 34 bent outwardly from the plates 32 below the rack have abutment with the front edges of the legs 19 and 20 to support the rack in substantially horizontal position extending forwardly from the frame, as illustrated in Fig. 1. The fact that the pivots 33 are in offset relation to the frame 35 of the rack 25 results in the spacing of the rack forwardly in relation to the frame 17 when folded, as clearly appears in Fig. 2, so that there is ample space between the rack 25 and the crosspieces 21 and 22 for the folded basket 4, as clearly illustrated in Fig. 2. In a similar way, the frame 36 of the lower rack 26 has offset pivots 33' provided by studs cooperating with segmental-shaped sheet metal plates 32' welded or otherwise suitably secured to the opposite sides of the frame 36, so that when the lower rack is folded, as shown in Fig. 2, its frame 36 is in forwardly spaced relation to the frame 17 and there is adequate space left between the rack 26 and the crosspieces 23 and 24 for the other basket 4 hanging on the hook 31. There are also outwardly bent lugs 34' provided on the plates 32', limiting pivotal movement of the rack 26 with respect to the frame 17 when extended to the horizontal position shown in Fig. 1. Hence, I can use the same kind of plates at 32' as at 32, for simplified production. I also provide folding braces 37 between the frame 17 and the frame 36 of the rack 26 to hold these parts rigidly in the relationship shown in Fig. 1, each brace being formed by an arm 38 pivoted on an elongated stud 28' serving both as a fastening for one end of the crosspiece 24 and as a pivot for the arm, and another arm 39 pivoted on a stud 40 on the side of the frame 36, the two arms being pivotally connected by a stud 41 so that the end 42 of the arm 38 overlaps the free end portion of the arm 39. An outwardly bent edge portion 43 on the arm 38 enters a recess formed by an outwardly bent portion 44 on the arm 39 to limit the unfolding movement of the arms and hold the arms rigidly in coextensive bracing relation, while permitting easy folding of the arms by an upward pull on their pivoted ends in the vicinity of the pivots 41 when the rack 26 is to be folded into parallelism with the frame 17.

The frames 35 and 36 for the racks 25 and 26 are preferably of thin channel bar stock for lightness and strength, the channels having their flanges projecting inwardly so that the outside of the frame presents a flush pleasing appearance. The channel frame member for each rack has its ends abutting, as indicated at 45, and suitably joined together by a piece spanning the joint on the inside of the frames and welded or otherwise suitably secured in the channels thereof. The fact that the flanges of the channel members project inwardly is of advantage in permitting fastening of the wire grills 46 by welding or otherwise securing the ends of the wires to said flanges. These grills are fastened to the upper flanges on the frames 35 and 36 so that the tops of these grills are substantially flush with the tops of the racks, and there is therefore no danger of catching the baskets under the flanges. Wire staples 47 are welded or otherwise suitably secured to the inwardly projecting flanges of the frames 35 and 36 at diametrically opposite sides near the fronts of the racks to prevent sidewise displacement of baskets from the racks. The baskets have their front ends resting between these projecting staples while the rear ends are entered between the legs 19 and 20 of the frame 17, in abutment with the crosspieces 22 and 24, so that there is no danger whatever of either basket falling off the carriage, even if it happens to be brushed against something as the carriage is moved along the aisle.

Plates 48, welded or otherwise suitably secured to the opposite sides of the frame 36 at the rear end thereof, provide supports for an axle 49 carrying rubber tired rollers 50 for rolling support of the carriage. Gusset plates 51, welded or otherwise suitably secured in the front corners of the frame 36 on the lower flanges, provide supports for rubber tired casters 52, and these casters provide rolling support for the carriage and permit steering the same around sharp turns as required in narrow aisles.

It should be clear from the foregoing description that I have provided an extremely sturdy basket carriage and yet one which is so light that there is no difficulty in the handling thereof by shoppers and clerks. The carriages fold compactly with the two foldable baskets inside, so that they require a minimum of floor space and can be stacked in quantities in convenient locations throughout a store in a small fraction of the space that would be required for non-folding devices. The carriages unfold easily, and the baskets likewise, and shoppers find that they roll easily and steer easily. The shoppers find it quite convenient to have the folded basket behind the folded rack, because the lower basket can be filled while the upper one is out of the way, and the additional basket is ready for use in the event more than one basket is needed. The carriage can be maneuvered along narrow aisles, because it is hardly any wider than the baskets used thereon. The recesses at 22 and 24, besides providing storage space for the folded baskets, provide for the secure holding of the unfolded baskets on the racks.

It is believed the foregoing description conveys a good understanding of the objects and advantages of my invention. The appended claims are drawn with a view to covering all legitimate modifications and adaptations.

I claim:

1. A device of the class described comprising an upright frame providing laterally spaced legs, a rack pivotally mounted on said legs to swing from substantially horizontal unfolded position to upright folded position substantially parallel to the frame, cross-members on said frame which in the folded position of said rack are in spaced substantially parallel relation to the latter to permit storage of a folded basket therebetween, and a forwardly projecting hook on one of said cross-members for suspending a folded basket thereon.

2. A device as set forth in claim 1, wherein said cross-members have portions thereof between the legs of the frame in rearwardly offset relation to the plane of the frame to provide storage space for the folded basket and also space into which one end of the basket when unfolded and placed on the unfolded rack is adapted to be entered to prevent sidewise displacement of the basket from the rack.

3. A device as set forth in claim 1, wherein said cross-members have portions thereof between the legs of the frame in rearwardly offset relation to the plane of the frame to provide storage space for the folded basket and also space into which one end of the basket when unfolded and placed on the unfolded rack is adapted to be entered to prevent sidewise displacement of the basket from the rack, said device including projections provided on opposite sides of the rack spaced from the pivoted end thereof arranged further to prevent sidewise displacement of the basket from the rack.

4. A device as set forth in claim 1, including projections provided on opposite sides of the rack spaced from the pivoted end thereof arranged to prevent sidewise displacement of the basket from the rack when the basket is unfolded and placed on the unfolded rack.

5. A device as set forth in claim 1, wherein said cross-members have portions thereof between the legs of the frame in rearwardly offset relation to the plane of the frame to provide storage space for the folded basket and also space into which one end of the basket when unfolded and placed on the unfolded rack is adapted to be entered to prevent sidewise displacement of the basket from the rack, and wherein the rack has the pivots thereof in offset relation to the plane thereof so that the rack when folded is in forwardly offset relation to the plane of the frame to provide additional storage space for the folded basket.

6. A device of the class described comprising an upright frame providing laterally spaced legs, a rack adapted to be pivotally mounted on said legs to swing from substantially horizontal unfolded position to upright folded position substantially parallel to the frame, and a pair of plates secured to opposite sides of said rack in parallel relation to and adjacent the inner sides of said frame legs, said plates projecting above and below the rack in its unfolded position, means on the upper projecting portions of said plates for pivotally mounting said rack on said legs, and outwardly extending projections provided on said plates on the lower projecting portions arranged to engage the front edges of said legs to limit pivotal movement of said rack relative to the frame in its unfolded position.

7. A device of the class described comprising an upright frame providing laterally spaced legs, a rack adapted to be pivotally mounted on said legs to swing from substantially horizontal unfolded position to upright folded position substantially parallel to the frame, and a pair of plates secured to opposite sides of said rack in parallel relation to and adjacent the inner sides of said frame legs, said plates projecting above and below the rack in its unfolded position, means on the upper projecting portions of said plates for pivotally mounting said rack on said legs, and outwardly extending projections provided on said plates on the lower projecting portions arranged to engage the front edges of said legs to limit pivotal movement of said rack relative to the frame in its unfolded position, and foldable jointed braces pivotally connected to the legs of said frame and to opposite sides of said rack in spaced relation to said rack pivots and adapted when extended to operative position to support said frame in rigid relation to said rack in the unfolded position of the latter with the last named outwardly extending projections fully engaged with the front edges of the legs.

8. A device of the class described comprising an upright frame providing laterally spaced legs, a rack adapted to be pivotally mounted on said legs to swing from substantially horizontal unfolded position to upright folded position substantially parallel to the frame, and a pair of plates secured to opposite sides of said rack in parallel relation to and adjacent the inner sides of said frame legs, said plates projecting above and below the rack in its unfolded position, means on the upper projecting portions of said plates for pivotally mounting said rack on said legs, and outwardly extending projections provided on said plates on the lower projecting portions arranged to engage the front edges of said legs to limit pivotal movement of said rack relative to the frame in its unfolded position, and a substantially horizontal cross-member joining said legs in vertically spaced relation to said rack pivots and having an intermediate portion in spaced substantially parallel relation to the plane of the frame.

9. A device as set forth in claim 1, wherein the rack has the pivots thereof in offset relation to the plane thereof so that the rack when folded is in forwardly offset relation to the plane of the frame to provide additional storage space for the folded basket.

10. A device of the class described comprising an upright frame providing laterally spaced legs, a rack pivotally mounted on said legs to swing from substantially horizontal unfolded position to upright folded position substantially parallel to the frame, one or more cross-members on said frame which in the folded position of said rack are in spaced substantially parallel relation to the latter to permit storage of a folded basket therebetween, and means for detachably supporting a folded basket in such position.

11. A device of the class described comprising an upright frame providing laterally spaced legs, a rack pivotally mounted on said legs to swing from substantially horizontal unfolded position to upright folded position substantially parallel to the frame, one or more cross-members on said frame which in the folded position of said rack are in spaced substantially parallel relation to the latter to permit storage of a folded basket therebetween, and means for detachably supporting a folded basket in such position, said rack having the pivots thereof in offset relation to the plane thereof so that the rack when folded is in forwardly offset relation to the plane of the frame and in proportionately increased spaced relation to said cross-members.

12. A device of the class described comprising an upright frame providing laterally spaced legs, a rack pivotally mounted on said legs to swing from substantially horizontal unfolded position to upright folded position substantially parallel to the frame, cross-members on said frame which in the folded position of said rack are in spaced substantially parallel relation to the latter to permit storage of a folded basket therebetween, and means for detachably supporting a folded basket in such position, said cross-members having portions thereof between the legs of the frame in rearwardly offset relation to the plane of the frame to provide increased storage space for the folded basket and also space into which one end of the basket when unfolded and placed on the unfolded rack is adapted to be entered to prevent sidewise displacement of the basket from the rack.

13. A device of the class described comprising an upright frame providing laterally spaced legs, a rack pivotally mounted on said legs to swing from substantially horizontal unfolded position to upright folded position substantially parallel to the frame, cross-members on said frame which in the folded position of said rack are in spaced substantially parallel relation to the latter to permit storage of a folded basket therebetween, means for detachably supporting a folded basket in such position, said cross-members having portions thereof between the legs of the frame in rearwardly offset relation to the plane of the frame to provide increased storage space for the folded basket and also space into which one end of the basket when unfolded and placed on the unfolded rack is adapted to be entered to prevent sidewise displacement of the basket from the rack, and projections provided on opposite sides of the rack spaced from the pivoted end thereof arranged further to prevent sidewise displacement of the basket from the rack.

ALBERT A. SMITH.